(12) United States Patent
Kim et al.

(10) Patent No.: US 11,699,822 B2
(45) Date of Patent: Jul. 11, 2023

(54) WEARABLE ACCESSORY AND PROTECTION CIRCUIT MODULE PROVIDED THEREIN

(71) Applicant: LiBEST INC., Daejeon (KR)

(72) Inventors: Joo Seong Kim, Daejeon (KR); Mi Hee Kim, Hwaseong-si (KR)

(73) Assignee: LIBEST INC., Daejeon (KR)

( * ) Notice: Subject to any disclaimer, the term of this patent is extended or adjusted under 35 U.S.C. 154(b) by 423 days.

(21) Appl. No.: 17/082,625

(22) Filed: Oct. 28, 2020

(65) Prior Publication Data

US 2021/0043883 A1 Feb. 11, 2021

Related U.S. Application Data

(63) Continuation of application No. PCT/KR2019/010371, filed on Aug. 14, 2019.

(30) Foreign Application Priority Data

Aug. 17, 2018 (KR) .................. 10-2018-0096096
Aug. 14, 2019 (KR) .................. 10-2019-0099552

(51) Int. Cl.
*G06F 1/16* (2006.01)
*H01M 50/116* (2021.01)
(Continued)

(52) U.S. Cl.
CPC ........... *H01M 50/116* (2021.01); *G06F 1/163* (2013.01); *H01M 10/049* (2013.01);
(Continued)

(58) Field of Classification Search
CPC ............. H01M 50/116; H01M 10/049; H01M 10/4257; H01M 50/20; H01M 2220/30;
(Continued)

(56) References Cited

U.S. PATENT DOCUMENTS 10,264,678 B1 * 4/2019 Zargar .................. G04C 10/00
2017/0139442 A1 * 5/2017 Yoshizumi .......... H04M 1/0247
(Continued)

FOREIGN PATENT DOCUMENTS

KR         10-1001447 B1    12/2010
KR    10-2016-0032712 A     3/2016
(Continued)

OTHER PUBLICATIONS

International Search Report of PCT/KR2019/010371 dated Nov. 26, 2019.

*Primary Examiner* — Michael C Zarroli
(74) *Attorney, Agent, or Firm* — Hamre, Schumann, Mueller & Larson, P.C.

(57) ABSTRACT

A wearable accessory, comprising: a device mounting part configured to be coupled with a device; and a body-coupled part formed to extend from the device mounting part along a lengthwise direction, wherein the body-coupled part includes: a flexible cell equipped with an electrode assembly, a casing that accommodates therein the electrode assembly, and a cell terminal connected to the electrode assembly and protruding from an opposite side of a side adjacent to the device mounting part; a connection circuit extending by being connected to a main circuit module formed on the device or the device mounting part; and a protection circuit module configured to connect the cell terminal and the connection circuit to each other and block an electrical connection between the cell terminal and the connection circuit when damage of the protection circuit module occurs by external force.

13 Claims, 12 Drawing Sheets

(51) Int. Cl.
*H01M 50/20* (2021.01)
*H01M 10/04* (2006.01)
*H01M 10/42* (2006.01)
*H02J 7/00* (2006.01)

(52) U.S. Cl.
CPC ....... *H01M 10/4257* (2013.01); *H01M 50/20* (2021.01); *H02J 7/0029* (2013.01); *H01M 2220/30* (2013.01)

(58) Field of Classification Search
CPC ............. H01M 10/425; H01M 50/247; H01M 50/136; H01M 50/258; H01M 50/572; H01M 50/574; G06F 1/163; G06F 1/188; H02J 7/0029; H02J 7/0031; Y02P 70/50; Y02E 60/10
See application file for complete search history.

(56) References Cited

U.S. PATENT DOCUMENTS

| | | | | |
|---|---|---|---|---|
| 2017/0235341 A1* | 8/2017 | Huitema | ................ | G04G 17/08 |
| | | | | 361/679.03 |
| 2017/0357214 A1* | 12/2017 | Choi | ................... | H01M 50/298 |
| 2019/0214610 A1* | 7/2019 | Lee | ................... | H01M 10/0587 |
| 2021/0025388 A1* | 1/2021 | Shinoda | .............. | F04C 15/0088 |

FOREIGN PATENT DOCUMENTS

| | | |
|---|---|---|
| KR | 10-2016-0092410 A | 8/2016 |
| KR | 10-1726774 B1 | 4/2017 |
| KR | 10-1783703 B1 | 10/2017 |
| KR | 10-1797694 B1 | 11/2017 |

\* cited by examiner

WEARABLE ACCESSORY AND PROTECTION CIRCUIT MODULE PROVIDED THEREIN

TECHNICAL FIELD

The present disclosure relates to a wearable accessory with a built-in flexible battery and a protection circuit module provided in the wearable accessory.

BACKGROUND

A secondary battery refers to a battery which can be charged and discharged, as opposed to a primary battery which cannot be charged, and has been widely used in the field of advanced electronic device fields such as cellular phone, notebook computer, camcorder, and the like.

Recently, attention has been focused on development and commercial availability of flexible devices such as flexible displays, wearable mobile phones and watches, and wearable personal computers. Therefore, a demand for flexibility of a secondary battery, which is a power supply device, is increasing.

As for a flexible battery, such as a lithium ion battery, applied to the wearable device, it is very important to supply a sufficient amount of power to the electronic device and ensure safety when bending occurs in close proximity to the human body. In particular, the flexible battery built in the bands or straps can be bent at various degrees and directions. Thus, in view of such various bending possibilities, design ensuring safety is needed.

DISCLOSURE OF THE INVENTION

Problems to be Solved by the Invention

An object of the present disclosure is to provide a wearable accessory equipped with a cell terminal and a protection circuit module that preemptively respond to bending caused by external force to suppress damage or malfunction of a flexible battery cell.

Another object of the present disclosure is to provide a protection circuit module that operates to electrically block or shut down a flexible battery cell built in a wearable accessory from the device before damage or malfunction of the cell occurs when the wearable accessory is bent by external force.

Means for Solving the Problems

According to an aspect of the present disclosure, a wearable accessory, comprising: a device mounting part configured to be coupled with a device; and a body-coupled part formed to extend from the device mounting part along a lengthwise direction, wherein the body-coupled part includes: a flexible cell equipped with an electrode assembly, a casing that accommodates therein the electrode assembly, and a cell terminal connected to the electrode assembly and protruding from an opposite side of a side adjacent to the device mounting part; a connection circuit extending by being connected to a main circuit module formed on the device or the device mounting part; and a protection circuit module configured to connect the cell terminal and the connection circuit to each other and block an electrical connection between the cell terminal and the connection circuit when damage of the protection circuit module occurs by external force.

The casing includes protrusions and grooves repeated along the lengthwise direction and extending along a widthwise direction crossing the lengthwise direction, and the protection circuit module includes a substrate part extending along the widthwise direction.

The substrate part is formed to have a length corresponding to a distance between the repeated protrusions or grooves and a width corresponding to a width of the protrusions or grooves.

The substrate part is configured to be cracked or fractured when the body-coupled part is bent with a smaller amount of bending than a predetermined amount of bending allowable to the flexible cell.

The protection circuit module includes: a substrate part extending along a widthwise direction crossing the lengthwise direction; a connection circuit pad formed on the substrate part and connected to the connection circuit; a cell terminal pad configured to be connected to the cell terminal; and a pattern part formed on the substrate part to electrically connect the connection circuit pad and the cell terminal pad to each other.

The pattern part is configured to break a current flow path between the connection circuit pad and the cell terminal pad when the substrate part is cracked or fractured.

The protection circuit module includes a PCM integrated circuit configured to sense a predetermined current or voltage condition and control the flow of current between the cell terminal and the main circuit module.

The protection circuit module includes a heat radiation plate bonded to a region of the substrate part overlapped by the PCM integrated circuit.

The protection circuit module includes a heat radiation hole formed to penetrate through a region of the substrate part overlapped by the PCM integrated circuit.

The electrode assembly include: first and second electrode plates having different polarities; and electrode tabs protruding from the first and second electrode plates, and the electrode tabs include electrode parallel connection tabs located facing the device mounting part and configured to respectively connect a plurality of the first electrode plates having the same polarity and a plurality of the second electrode plates having the same polarity.

According to another aspect of the present disclosure, a protection circuit module that is provided in a wearable accessory including a flexible cell and a device mounting part located on one side of the flexible cell, the protection circuit module comprising: a substrate part coupled to the other side of the flexible cell; a cell terminal pad formed on the substrate part to be connected to a cell terminal protruding from the other side of the flexible cell; a connection circuit pad formed on the substrate part to be connected to a connection circuit extending by being connected to a main circuit module of the device mounting part; and a pattern part formed on the substrate part to electrically connect the cell terminal pad and the connection circuit pad to each other and block an electrical connection between the cell terminal pad and the connection circuit pad when the substrate part is cracked or fractured.

The substrate part is formed to have a width corresponding to a width of the flexible cell and a length corresponding to a distance between protrusions or grooves repeated along a lengthwise direction in a casing of the flexible cell.

The substrate part is configured to be cracked or fractured when the wearable accessory is bent with a smaller amount of bending than a predetermined amount of bending allowable to the flexible cell.

Effects of the Invention

In a wearable accessory according to the present disclosure, a protection circuit module located on a part or an external part of a flexible cell within a body-coupled part and configured to form an electrical connection can electrically block or shut down the flexible cell when a user applies external force in a widthwise direction of the body-coupled part and excessively deforms the body-coupled part. With this protection circuit module, it is possible to suppress damage or malfunction of the flexible cell having high energy, and thus possible to ensure the safety of the device.

In particular, a substrate part of the protection circuit module is designed so as to correspond to the distance and the width of protrusions or grooves formed in a casing and thus can sensitively operate when the body-coupled part is in a state of misuse, such as being bent in a direction different from a main bending direction.

In the protection circuit module according to the present disclosure, a crack or fracture of the substrate part results in an electrical short of a pattern part, and, thus, it is possible to preemptively suppress damage or malfunction of the flexible cell when bending occurs by external force. The substrate part of the protection circuit module may be a nonelastic body that is not deformed but fractured by a predetermined level of external bending force, or may be an elastic body having a lower modulus of elasticity than the flexible cell. Therefore, it is possible to suppress damage which may be caused by damage or malfunction of the flexible cell, and thus possible to improve safety and economic feasibility.

BEST MODE FOR CARRYING OUT THE INVENTION

Figure 1:
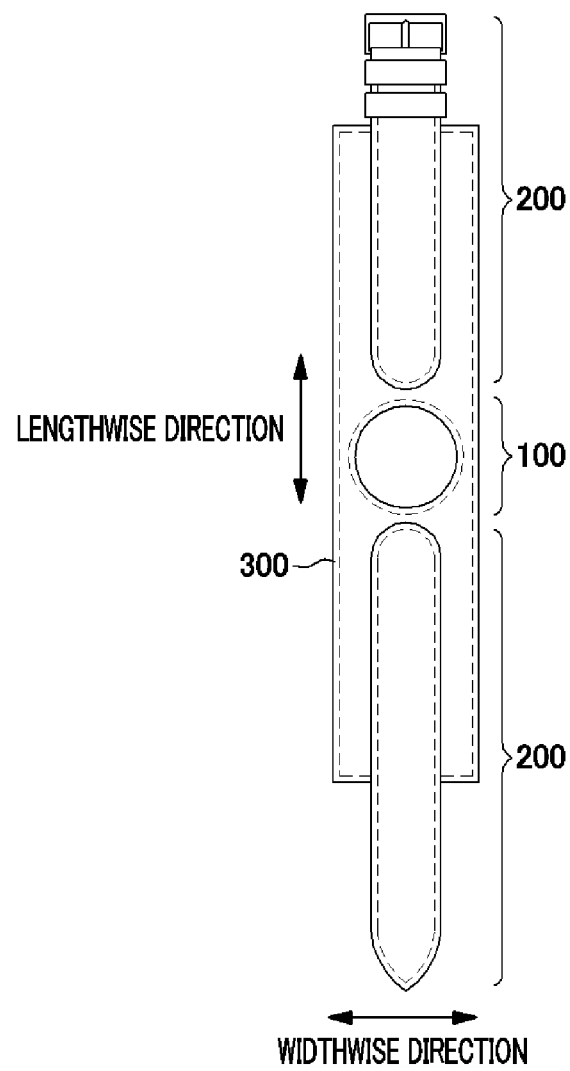
FIG. 1 is a front view of a wearable accessory according to the present disclosure.

Hereinafter, embodiments of the present disclosure will be described in detail with reference to the accompanying drawings so that the present disclosure may be readily implemented by those skilled in the art. However, it is to be noted that the present disclosure is not limited to the embodiments but can be embodied in various other ways. In drawings, parts irrelevant to the description are omitted for the simplicity of explanation, and like reference numerals denote like parts through the whole document.

Through the whole document, the term "connected to" or "coupled to" that is used to designate a connection or coupling of one element to another element includes both a case that an element is "directly connected or coupled to" another element and a case that an element is "electronically connected or coupled to" another element via still another element. Further, through the whole document, the term "comprises or includes" and/or "comprising or including" used in the document means that one or more other components, steps, operation and/or existence or addition of elements are not excluded in addition to the described components, steps, operation and/or elements unless context dictates otherwise.

In the present specification, some of operations or functions described as being performed by a device may be performed by a server connected to the device. Likewise, some of operations or functions described as being performed by a server may be performed by a device connected to the server.

Figure 2:
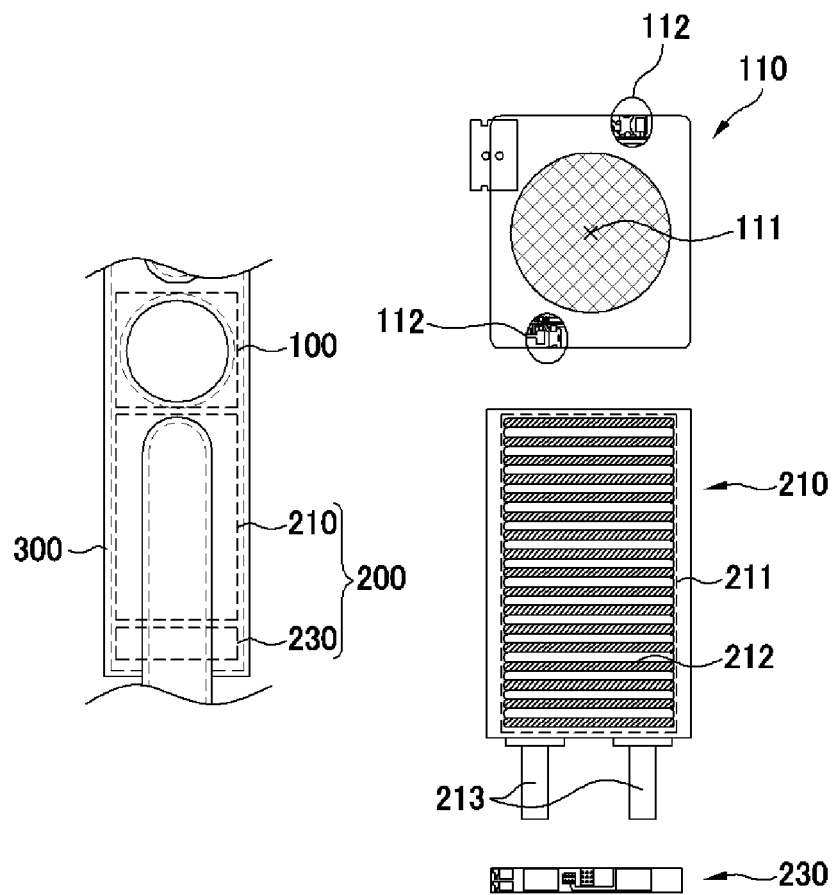
FIG. 2 is an illustration of components inside the wearable accessory shown in FIG. 1.
Figure 3:
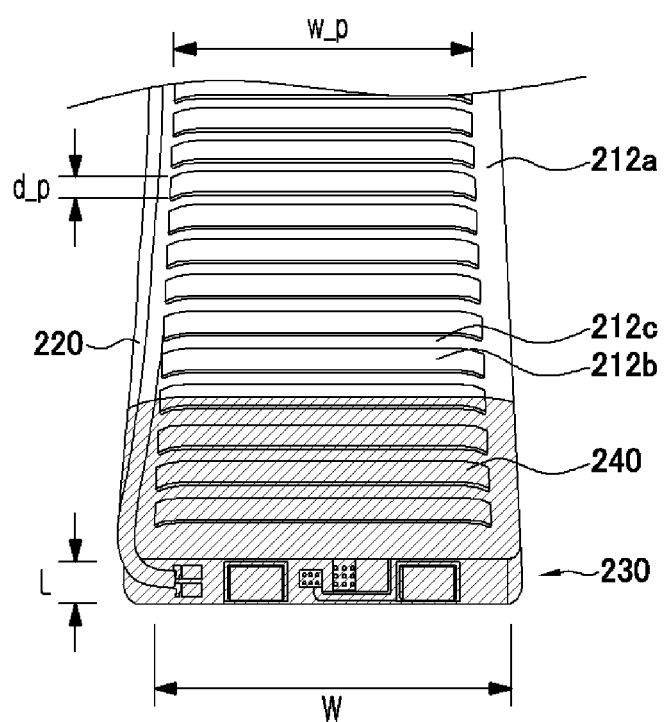
FIG. 3 is an illustration of an electrode assembly shown in FIG. 2.
Figure 4:
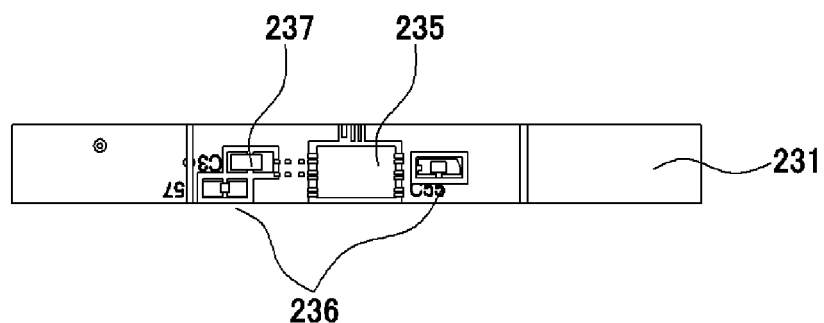
FIG. 4 is an exploded view of the electrode assembly shown in FIG. 3.
Figure 5:
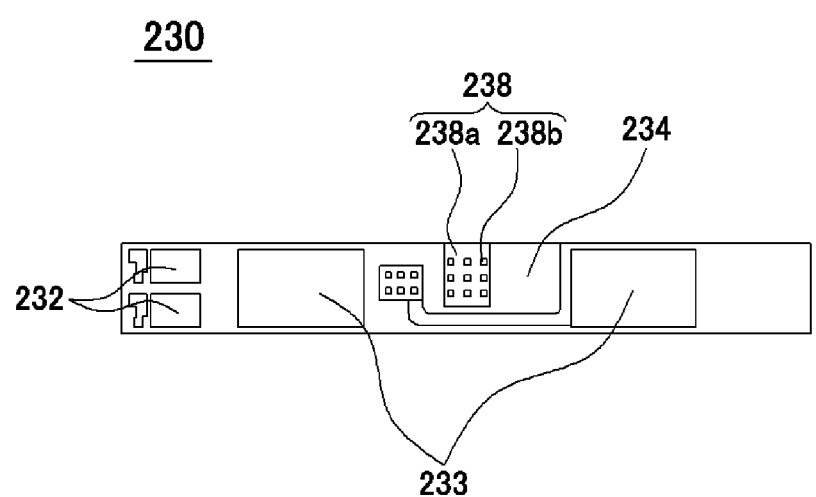
FIG. 5 is a detailed view of a combination of a flexible cell and a protection circuit module shown in FIG. 2.

FIG. 1 is a front view of a wearable accessory according to the present disclosure, and FIG. 2 is an illustration of components inside the wearable accessory shown in FIG. 1. Further, FIG. 3 is an illustration of an electrode assembly shown in FIG. 2, and FIG. 4 is an exploded view of the electrode assembly shown in FIG. 3. Furthermore, FIG. 5 is a detailed view of a combination of a flexible cell and a protection circuit module shown in FIG. 2. Hereinafter, the structure and function of a wearable accessory 10 according to the present disclosure will be described with reference to FIG. 1 to FIG. 5.

As illustrated in the drawings, the wearable accessory 10 according to the present disclosure includes a device mounting part 100 and a body-coupled part 200. The wearable accessory 10 according to the present disclosure can be easily deformed in a lengthwise direction. Also, the wearable accessory 10 can be deformed in a widthwise direction by excessive external force, which may cause a functional problem of a flexible cell and thus result in a safety problem. Therefore, a long narrow strap-shaped substrate part is placed at both end portions of the body-coupled part 200, which are most likely to be problematic, in a direction parallel to the widthwise direction of the body-coupled part 200 to respond to bending. Accordingly, it is possible to safely protect the battery cell. The wearable accessory 10 according to the present disclosure may be integrated with a device into a wearable device, or may be an auxiliary device to/from which the wearable device is attached/detached and which is worn on/coupled to the body of a user.

Specifically, the device mounting part 100 is configured to be coupled with the device. The device includes various electronic devices that can be implemented as a wearable electronic device and end devices that can process and offer information and may be supplied with power to operate.

In the present embodiment, the device mounting part 100 may include a main circuit module 110. The main circuit module 110 may function as a battery management system (BMS) that electrically controls and protects a flexible cell 210 which will be described later. The main circuit module 110 may be configured as a printed circuit board (PCB) with circuits on a substrate. However, unlike the present embodiment, the main circuit module may be built in a device to be coupled with the device mounting part 100. In this case, this device may manage the flexible cell 210. In the present embodiment, the device mounting part 100 may include at least a part of a covering part 300 that accommodates therein the main circuit module 110 or a separate case. As illustrated in the drawings, the main circuit module 110 may include an opening 111 through which at least a part of a rear surface of an electronic device is open to the skin of the user.

The body-coupled part 200 may be formed to extend from the device mounting part 100 toward both sides (in the lengthwise direction in FIG. 1). The body-coupled part 200 can be bent to be wrapped in close contact with the user's body part such as the wrist, ankle, thigh, neck, forehead, waist or the like, and both end portions thereof can be coupled to each other. For example, the body-coupled part 200 may include a wrist band (or strap), a head band, a neck band, or the like. The body-coupled part 200 may include a part of the covering part 300 extending from the device mounting part 100 or a separate band. For example, the covering part 300 may be made of a deformable material, such as leather or rubber, used for a wrist watch or the like. Further, the body-coupled part 200 may be a part of a wearable device in the form of a face-mounted VR device, glasses or sunglasses and may be made of a deformable material such as plastic or the like.

The body-coupled part 200 of the wearable accessory 10 according to the present disclosure may further include the flexible cell 210. According to the present disclosure, the flexible cell 210 may be accommodated in the covering part 300 to supply power to an electronic device to be coupled with the device mounting part 100.

According to an embodiment of the present disclosure, the flexible cell 210 may be configured as a lithium ion battery. That is, the flexible cell 210 may include an electrode assembly 211 in which first and second electrode plates 211a and 211b having different polarities, an active material coated on the first and second electrode plates 211a and 211b, and a separator 211c interposed between the first and second electrode plates 211a and 211b are stacked. Here, the first electrode plate 211a may be made of copper as a negative electrode and the second electrode plate 211b may be made of aluminum as a positive electrode.

Further, the electrode assembly 211 may further include electrode tabs protruding from the first and second electrode plates 211a and 211b toward the surfaces. Specifically, the electrode tabs may include electrode parallel connection tabs 211a1 and 211b1 that respectively connect the first electrode plates 211a having the same polarity and the second electrode plates 211b having the same polarity among a plurality of the stacked first and second electrode plates 211a and 211b, and electrode lead connection tabs 211a2 and 211b2 that respectively protrude from any one of a plurality of first electrode plates 211a and any one of a plurality of second electrode plates 211b.

The flexible cell 210 according to the present disclosure may further include a casing 212 that accommodates therein the electrode assembly 211 and cell terminals 213 connected to the electrode assembly 211. The casing 212 may have a layered structure including, for example, polyolefin-based resin, metal and nylon layers.

To accommodate the flexible cell 210 in the body-coupled part 200 which extends along the lengthwise direction, the electrode assembly 211 and the casing 212 of the present disclosure may also be formed long in the lengthwise direction. The casing 212 may be formed overlapping the electrode assembly 211 and may include a sealing part 212a extending along the edge of the electrode assembly 211 to seal the electrode assembly 211 and bond the casings 212.

The cell terminals 213 are exposed to the outside of the casing 212 while being connected to a part of the electrode assembly 211 accommodated in the casing 212 and serve as electrical contact points with a device or a component. The cell terminals 213 may be directly or indirectly connected to the above-described electrode lead connection tabs and may include a positive electrode lead and a negative electrode lead respectively connected to the electrode lead connection tabs 211a2 and 211b2 of the first and second electrode plates 211a and 211b.

Meanwhile, the flexible cell 210 of the present disclosure may be located inside the body-coupled part 200 and can be bent in response to deformation of the body-coupled part 200. The wearable accessory 10 having the structure as described herein can be bent around an axis extending along the widthwise direction crossing (for example, orthogonal to) the lengthwise direction for application as a wearable device. That is, the body-coupled part 200 extending along the lengthwise direction is bent to be wrapped around the wrist and both end portions of the body-coupled part 200 are coupled to each other so as to be worn by the user.

The flexible cell 210 needs to be configured to be bent in response to bending of the body-coupled part 200 and to ensure the safety of the battery while being bent. As one of the structures for this purpose, the casing 212 of the flexible cell 210 according to the present disclosure may include protrusions 212b and grooves 212c formed into a corrugated shape.

Specifically, the casing 212 may include the protrusions 212b and the grooves 212c repeated along the lengthwise direction and extending in parallel to each other along the widthwise direction. A plurality of protrusions 212b may be convexly protruded toward the outside of the casing 212, and each of the grooves 212c may be concavely recessed toward the inside the casing 212 between the protrusions 212b. Since the protrusions 212b and the grooves 212c are alternately repeated in the lengthwise direction, the casing 212 may have a corrugated structure having a predetermined shape, distance and height in the lengthwise direction.

Meanwhile, the body-coupled part 200 and the flexible cell 210 may be put in a situation where they are bent in a direction different from the above-described direction of bending for wearing (bending around the axis along the widthwise direction). For example, the user may bend the body-coupled part 200 to be folded long and narrow around an axis along the lengthwise direction. If the casing 212 has a corrugated structure extending along the lengthwise direction as described above according to an embodiment of the present disclosure, the flexible cell 210 may be subjected to damage or malfunction by bending around the axis along the lengthwise direction.

It is not desirable that bending around the axis along the lengthwise direction should be strictly restricted when using the wearable accessory 10 according to the present disclosure. However, if the amount of bending is intentionally too large, the flexible cell 210 needs to be protected in order to minimize the risk caused by damage or malfunction.

To this end, the wearable accessory 10 according to the present disclosure may include the flexible cell 210 in which the cell terminals 213 are located toward a predetermined direction, a connection circuit 220 and a protection circuit module (PCM) 230.

In the present disclosure, the above-described cell terminals 213 may be located not on the side adjacent to the device mounting part 100, but on the opposite side thereof. As illustrated in the drawings, the cell terminals 213 may be placed not to protrude from the inside of the casing 212 toward the device mounting part 100, but to protrude to the outside toward both end portions of the body-coupled part 200 extending along the lengthwise direction. That is, in the present disclosure, the cell terminals 213 may not be in direct contact with the main circuit module 110, but may be located apart from the main circuit module 110 with the electrode assembly 211 and the casing 212 interposed therebetween.

Further, the connection circuit 220 may extend in parallel to the flexible cell 210 along the lengthwise direction. The connection circuit 220 extends along an outer surface of the casing 212 (particularly, the sealing part 212a in the present embodiment), and one end portion thereof may be connected to the main circuit module 110 of the device mounting part 100. In the main circuit module 110, a power supply pad 112 to be in contact with and electrically connected to the one end portion of the connection circuit 220 may be formed.

Also, the other end portion of the connection circuit 220 may be in contact with and electrically connected to the protection circuit module 230. The protection circuit module 230 may include two pairs of pads connecting the cell terminals 213 and the connection circuit 220. That is, the protection circuit module 230 is connected to the cell terminals 213 and the connection circuit 220, and an electric current flows between the cell terminals 213 and the connection circuit 220 through the protection circuit module 230.

In the present disclosure, the connection circuit 220 may be comprised of a coated conducting wire (wire), but may be configured as a printed circuit board serving as a conducting wire. Particularly, the connection circuit 220 may be configured as a flexible printed circuit board (FPCB) to minimize influence on bending of the flexible cell 210 or miniaturize the component.

Further, the protection circuit module 230 may be placed in a current flow path between the cell terminals 213 and the main circuit module 110 and configured to block and allow the flow of current. For example, the protection circuit module 230 may be placed adjacent to the cell terminals 213 and may make contact points with the cell terminals 213 and the main circuit module 110 to form a current flow path. Here, the connection circuit 220 may be further placed between the main circuit module 110 and the protection circuit module 230. The protection circuit module 230 may be coupled to an end portion of the casing 212 adjacent to the cell terminals 213 of the flexible cell 210. As illustrated in the drawings, the protection circuit module 230 may be coupled to the end portion of the casing 212 with an adhesive member 240 such as a tape or the like. Furthermore, the protection circuit module 230 may be configured to block an electrical connection between the cell terminals 213 and the connection circuit 220 when damage is caused by external force. The damage to the protection circuit module 230 caused by external force may be a crack or fracture of a substrate part 231 which will be described later, or may be a disconnection of an internal circuit caused by deformation of the protection circuit module.

As described above, in the present disclosure, the protection circuit module 230 is added. Therefore, when the end portions of the body-coupled part 200 are greatly deformed without intention or anticipation of the user, it is possible to suppress the spread of the risk occurring when current flow paths are broken simultaneously and an electrical short portion is formed. Particularly, if bending occurs excessively not along the main direction (bending around the axis along the widthwise direction) but around the axis along the lengthwise direction and then, the flexible cell 210 is abnormally charged, the flexible cell 210 may rapidly deteriorate in performance or generate heat, which may result in the spread of damage. For this reason, the wearable accessory 10 according to the present disclosure has an effect of improving safety.

Meanwhile, as described above, the electrode assembly 211 of the flexible cell 210 provided inside the wearable accessory 10 according to the present disclosure may include electrode tabs including the electrode parallel connection tabs 211a1 and 211b1 and the electrode lead connection tabs 211a2 and 211b2.

Here, the electrode lead connection tabs 211a2 and 211b2 and the electrode parallel connection tabs 211a1 and 211b1 may be placed on both sides of the electrode assembly 211 along the lengthwise direction. Referring to FIG. 3 and FIG. 4, the electrode lead connection tabs 211a2 and 211b2 may protrude toward an outer end portion of the body-coupled part 200 so as to be connected to the protection circuit module 230 via the cell terminals 213. Further, the electrode parallel connection tabs 211a1 and 211b1 may be located opposite to the electrode lead connection tabs 211a2 and 211b2 and may protrude toward the device mounting part 100. Specifically, a pair of the electrode parallel connection tabs 211a1 and 211b1 may be formed to respectively connect the first electrode plates 211a in parallel to each other and the second electrode plates 211b in parallel to each other.

If the electrode parallel connection tabs 211a1 and 211b1 connecting a plurality of first and second electrode plates 211a and 211b are placed on the side of the device mounting part 100, a structure configured to restrict a plurality of electrode plates to each other may be located inside the body-coupled part 200 extending to both sides of the device mounting part 100 so as to be adjacent to the device mounting part 100. Typically, the wearer of the wearable accessory 10 according to the present disclosure wears the wearable accessory 10 by gradually bending the body-coupled part 200 to the both sides of the device mounting part 100 along the lengthwise direction. Here, a plurality of first and second electrode plates 211a and 211b is bent from the side of the electrode parallel connection tabs 211a1 and 211b1 which are structurally restricted to each other. Therefore, friction or stress between contact surfaces of the plurality of first and second electrode plates 211a and 211b may decrease, as compared to when bending occurs from the electrode lead connection tabs 211a2 and 211b2 which are not combined with each other. Accordingly, a plurality of electrode plates can be more stably maintained in a close contact state.

The overall configuration of the wearable accessory 10 and the placement and function of the protection circuit module 230 according to the present disclosure have been described above. Hereinafter, the structure and function of the protection circuit module 230 according to the present disclosure will be described in detail.

Figure 6:
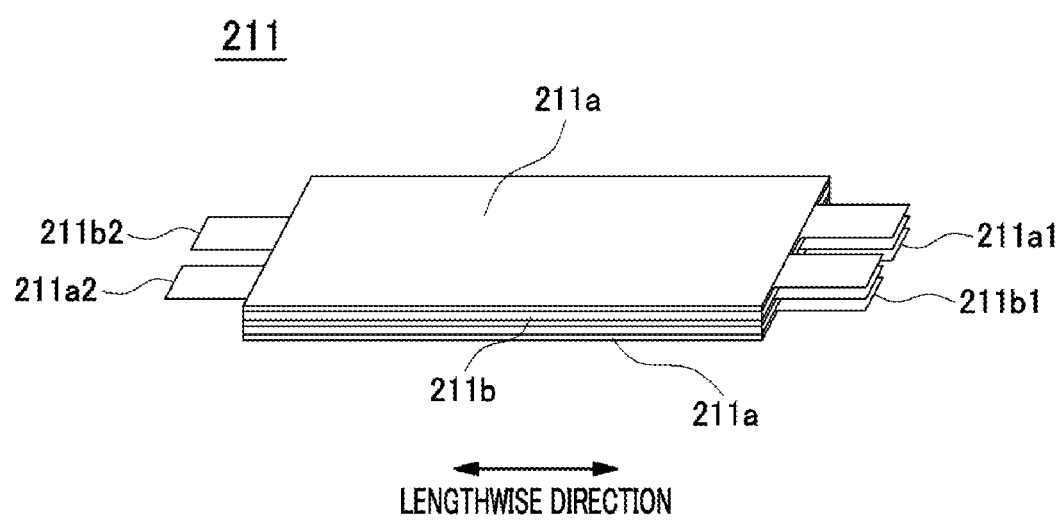
FIG. 6 is a front view of the protection circuit module shown in FIG. 2.
Figure 7:
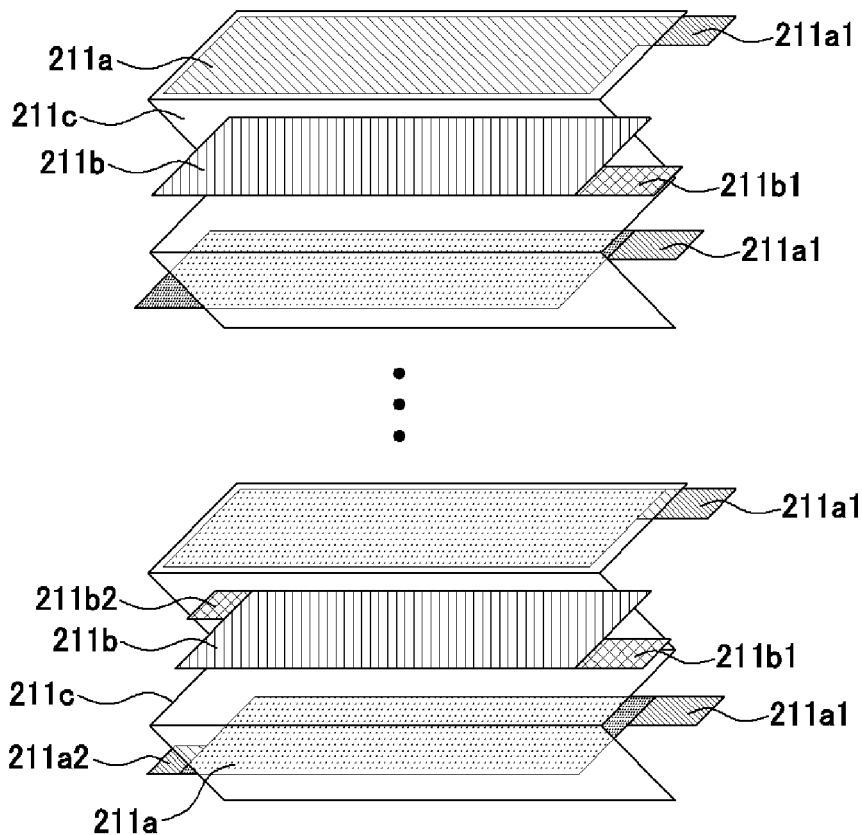
FIG. 7 is a rear view of the protection circuit module shown in FIG. 2.

FIG. 6 is a front view of the protection circuit module shown in FIG. 2, and FIG. 7 is a rear view of the protection circuit module shown in FIG. 2. Referring to FIG. 6 and FIG. 7, the protection circuit module 230 according to the present disclosure may include the substrate part 231, connection circuit pads 232, cell terminal pads 233 and a pattern part 234. The substrate part 231 may be, for example, a printed circuit board (PCB) and may be formed into a rectangular parallelepiped-shaped strap which extends long in the widthwise direction and has a small thickness.

In the present disclosure, the substrate part 231 may function to block an electrical connection between the connection circuit 220 and the cell terminals 213 when a crack or fracture occurs due to external force. Therefore, a width W, a length L and a thickness of the substrate part 231 may be designed in view of the corrugated structure of the casing 212.

Specifically, the length L of the substrate part 231 may be designed corresponding to a distance d_p between the repeated protrusions 212b or grooves 212c. Further, the width W of the substrate part 231 may be designed corresponding to a width w_p of the protrusions 212b or grooves. The value (length or width L or W) corresponding to the distance or width d_p or w_p may be identical to each other, or may be a design value calculated according to the relational equation.

The substrate part 231 may be manufactured and placed by designing the size and selecting the material of the substrate part 231 to adjust the strength of substrate part 231 so that when a smaller amount of bending than a predetermined amount of bending allowable to the flexible cell 210 occurs, the substrate part 231 is cracked or fractured. That is, when the body-coupled part 200 is bent, the substrate part 231 may break an electric current before the flexible cell 210 is damaged. In particular, when the body-coupled part 200 is bent along the main direction, an electrical current is normally maintained at the end portion of the casing 212, and when the body-coupled part 200 is excessively bent along the other directions, the substrate part 231 may function to break an electric current.

Meanwhile, the connection circuit pads 232 and the cell terminal pads 233 provided in the protection circuit module 230 may serve as respective contact points for contact and electrical connection with the connection circuit 220 and the cell terminals 213. As illustrated in the drawings, the cell terminal pads 233 of a pair may be placed to be apart from each other in the widthwise direction, and a positive electrode terminal and a negative electrode terminal may be connected to the cell terminal pads 233, respectively.

Further, the connection circuit pads 232 may be formed at one end portion of the substrate part 231 in the widthwise direction. The connection circuit 220 may include a positive electrode conducting wire and a negative electrode conducting wire, and the connection circuit pads 232 of a pair may also be placed to be apart from each other in the lengthwise direction so as to be connected to the positive electrode and negative electrode conducting wires, respectively.

Furthermore, the pattern part 234 is formed inside or on the surface of the substrate part 231 and may function as a conducting wire. That is, the pattern part 234 is formed to electrically connect the connection circuit pads 232 and the cell terminal pads 233 to each other, and for example, the pattern part 234 may be formed to connect the positive electrode terminal to the positive electrode conducting wire and the negative electrode terminal to the negative electrode conducting wire. Electrical connections between the connection circuit pads 232 and the cell terminal pads 233 through the pattern part 234 may be blocked by a crack or fracture of the substrate part 231.

Here, the pattern part 234 may be designed to be uniformly distributed on the entire surface of the substrate part 231. Therefore, when a specific region of the substrate part 231 is cracked or fractured, the maintenance of electrical connection in the non-fractured region by the pattern part 234 can be minimized.

Meanwhile, as illustrated in the drawings, the connection circuit pads 232 and the cell terminal pads 233 may be coupled with the connection circuit 220 and the cell terminals 213, respectively, by welding. However, to minimize a non-uniform distribution of the strength of the substrate part 231 which may be caused by an increase in thickness of the welding portion, the connection circuit 220 and the cell terminals 213 may be inserted into and fixed to the connection circuit pads 232 and the cell terminal pads 233, respectively, by a connector method.

Since a current flow path of the pattern part 234 is broken by a crack or fracture of the substrate part 231, the protection circuit module 230 according to the present disclosure can preemptively suppress damage or malfunction of the flexible cell 210 when bending occurs by external force. Therefore, the spread of damage caused by damage to the flexible cell 210 can be suppressed, and, thus, the safety of the wearable device and accessory can be improved. Also, the wearable accessory 10 with improved safety can be manufactured by adding or replacing the protection circuit module 230.

The protection circuit module 230 according to the present disclosure may be configured to function as a battery management system that electrically controls and protects the flexible cell 210 in addition to the above-described function. According to the present embodiment, as illustrated in the drawings, the protection circuit module 230 may further include a PCM integrated circuit (PCM IC) 235.

The PCM IC 235 may be configured to sense a predetermined current or voltage condition and block an electrical connection between the cell terminals 213 and the connection circuit 220. For example, when the flexible cell 210 is excessively charged or discharged, the PCM IC 235 may block an electrical connection to protect the flexible cell 210 and thus maintain performance and ensure safety.

Also, as illustrated in the drawings, the protection circuit module 230 may further include a resistance 236 and a condenser 237. The resistance 236 and the condenser 237 together with the PCM IC 235 may perform an operation for protecting the flexible cell 210.

As such, if the protection circuit module 230 according to the present disclosure is configured to perform a part of functions of the battery management system, the function can be performed stably, as compared to when the main circuit module 110 is equipped with a component that performs the function. For example, when the PCM IC 235 is dispersed and provided in the protection circuit module 230, overheating can be suppressed, as compared to when the PCM IC 235 together with other circuit components are integrated and provided in the main circuit module 110.

As illustrated in the drawings, the protection circuit module 230 may further include a heat radiation unit 238 formed in a region overlapped by the PCM IC 235. The heat radiation unit 238 may include, for example, a heat radiation plate 238a or a heat radiation hole 238b.

Specifically, the heat radiation plate 238a may be bonded to a region of the substrate part 231 covered by the PCM IC 235. Desirably, the heat radiation plate 238a may be made of a material having a higher thermal conductivity than the substrate part 231 and may have a rough surface. Further, the heat radiation hole 238b may be formed to penetrate through the region of the substrate part 231 covered by the PCM IC 235. As illustrated in the drawings, a plurality of heat radiation holes 238b may be arranged in, for example, a region of the substrate part 231 where heat generation is concentrated.

Since the heat radiation unit 238 such as the heat radiation hole 238b or the heat radiation plate 238a is further provided, the protection circuit module 230 according to the present disclosure may increase in convection heat transfer coefficient due to the increase in surface area or may increase in conduction heat transfer due to the increase in thermal conductivity. Therefore, while the protection circuit module 230 is operated, heat radiation can be performed more effectively.

Figure 8A:
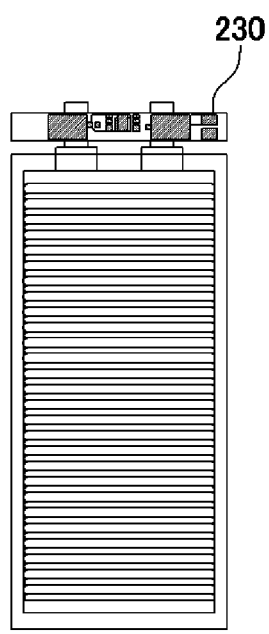
FIGS. 8A to 8E illustrate embodiments of the protection circuit module of the present disclosure placed at various positions within the wearable accessory of the present disclosure.
Figure 8B:
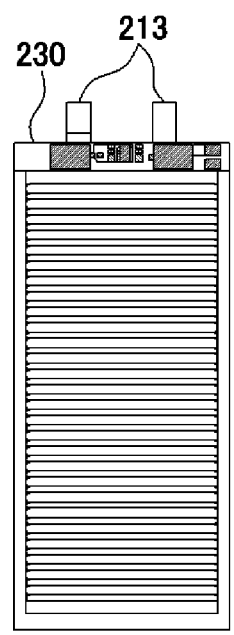
Figure 8C:
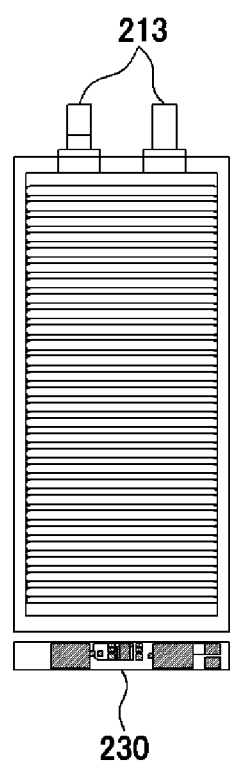
Figure 8D:
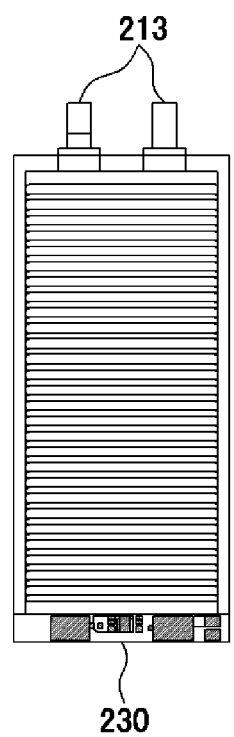
Figure 8E:
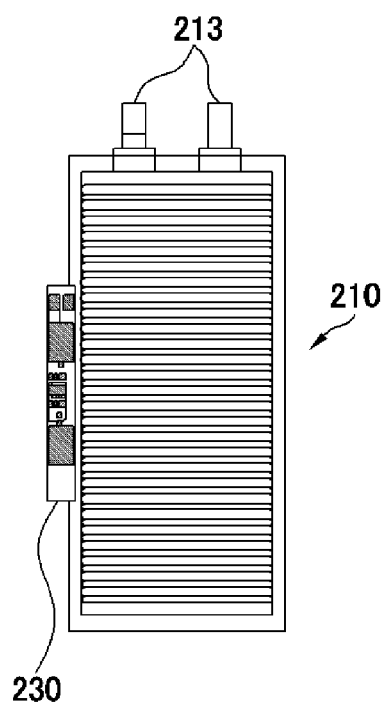

FIGS. 8A to 8E illustrate embodiments of the protection circuit module 230 of the present disclosure placed at various positions within the wearable accessory 10 of the present disclosure. FIG. 8A illustrates an embodiment where the protection circuit module 230 is placed to overlap on the cell terminals 213 protruding from the edge of a body of the flexible cell 210. Further, as illustrated in FIG. 8B, the protection circuit module 230 may be placed adjacent to the cell terminals 213 so as to overlap on a part of the body of the flexible cell 210. FIG. 8C and FIG. 8D illustrate embodiments where the protection circuit module 230 is placed opposite to the cell terminals 213 with the flexible cell 210 interposed therebetween. In this case, the protection circuit module 230 may be placed adjacent to the body of the flexible cell 210 or may overlap on the body of the flexible cell 210. Furthermore, as illustrated in FIG. 8E, the protection circuit module 230 according to the present disclosure the flexible cell 210 may be located at an end portion in the widthwise direction. As in the embodiments illustrated in FIG. 8A to FIG. 8E, the position of the protection circuit module 230 may be determined in view of a region vulnerable to bending or a region where stress is concentrated in the wearable accessory 10, or the design limit conditions of the wearable device.

The above description of the present disclosure is provided for the purpose of illustration, and it would be understood by those skilled in the art that various changes and modifications may be made without changing technical conception and essential features of the present disclosure. Thus, it is clear that the above-described embodiments are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

INDUSTRIAL APPLICABILITY

The present disclosure can be used as a wearable device equipped with a built-in battery or a component of the wearable device.

We claim:

1. A wearable accessory, comprising:
a device mounting part configured to be coupled with a device; and
a body-coupled part formed to extend from the device mounting part along a lengthwise direction,
wherein the body-coupled part includes:
a flexible cell equipped with an electrode assembly, a casing that accommodates therein the electrode assembly, and a cell terminal connected to the electrode assembly and protruding from an opposite side of a side adjacent to the device mounting part;
a connection circuit extending by being connected to a main circuit module formed on the device or the device mounting part; and
a protection circuit module configured to connect the cell terminal and the connection circuit to each other and block an electrical connection between the cell terminal and the connection circuit when damage of the protection circuit module occurs by external force.

2. The wearable accessory of claim 1,
wherein the casing includes protrusions and grooves repeated along the lengthwise direction and extending along a widthwise direction crossing the lengthwise direction, and
the protection circuit module includes a substrate part extending along the widthwise direction.

3. The wearable accessory of claim 2,
wherein the substrate part is formed to have a length corresponding to a distance between the repeated protrusions or grooves and a width corresponding to a width of the protrusions or grooves.

4. The wearable accessory of claim 2,
wherein the substrate part is configured to be cracked or fractured when the body-coupled part is bent with a smaller amount of bending than a predetermined amount of bending allowable to the flexible cell.

5. The wearable accessory of claim 1,
wherein the protection circuit module includes:
a substrate part extending along a widthwise direction crossing the lengthwise direction;
a connection circuit pad formed on the substrate part and connected to the connection circuit;
a cell terminal pad configured to be connected to the cell terminal; and
a pattern part formed on the substrate part to electrically connect the connection circuit pad and the cell terminal pad to each other.

6. The wearable accessory of claim 5,
wherein the pattern part is configured to break a current flow path between the connection circuit pad and the cell terminal pad when the substrate part is cracked or fractured.

7. The wearable accessory of claim 5,
wherein the protection circuit module includes a PCM integrated circuit configured to sense a predetermined current or voltage condition and control the flow of current between the cell terminal and the main circuit module.

8. The wearable accessory of claim 7,
wherein the protection circuit module includes a heat radiation plate bonded to a region of the substrate part overlapped by the PCM integrated circuit.

9. The wearable accessory of claim 7,
wherein the protection circuit module includes a heat radiation hole formed to penetrate through a region of the substrate part overlapped by the PCM integrated circuit.

10. The wearable accessory of claim 1,
wherein the electrode assembly include:
first and second electrode plates having different polarities; and
electrode tabs protruding from the first and second electrode plates, and
wherein the electrode tabs include electrode parallel connection tabs located facing the device mounting part and configured to respectively connect a plurality of the first electrode plates having the same polarity and a plurality of the second electrode plates having the same polarity.

11. A protection circuit module that is provided in a wearable accessory including a flexible cell and a device mounting part located on one side of the flexible cell, the protection circuit module comprising:
a substrate part coupled to the other side of the flexible cell;

a cell terminal pad formed on the substrate part to be connected to a cell terminal protruding from the other side of the flexible cell;

a connection circuit pad formed on the substrate part to be connected to a connection circuit extending by being connected to a main circuit module of the device mounting part; and a pattern part formed on the substrate part to electrically connect the cell terminal pad and the connection circuit pad to each other and block an electrical connection between the cell terminal pad and the connection circuit pad when the substrate part is cracked or fractured.

12. The protection circuit module of claim 11, wherein the substrate part is formed to have a width corresponding to a width of the flexible cell and a length corresponding to a distance between protrusions or grooves repeated along a lengthwise direction in a casing of the flexible cell.

13. The protection circuit module of claim 11, wherein the substrate part is configured to be cracked or fractured when the wearable accessory is bent with a smaller amount of bending than a predetermined amount of bending allowable to the flexible cell.

\* \* \* \* \*